United States Patent Office 3,692,683
Patented Sept. 19, 1972

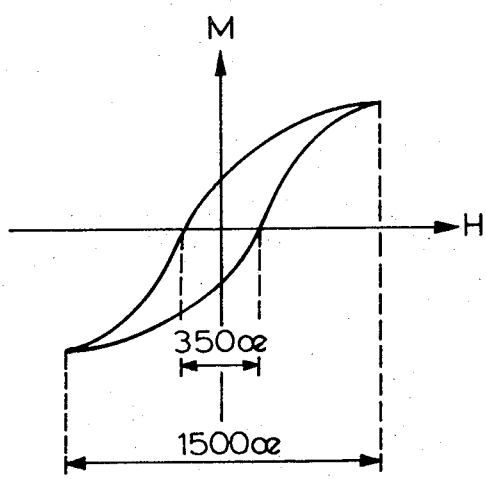

---

3,692,683
PROCESS FOR PREPARING MAGNETIZABLE
MATERIAL
John W. Geus, Geleen, Netherlands, assignor to
Stamicarbon N.V., Heerlen, Netherlands
Filed Mar. 26, 1970, Ser. No. 23,032
Claims priority, application Netherlands, Mar. 28, 1969,
6904796
Int. Cl. C10g 49/08; C04b 35/26
U.S. Cl. 252—62.62                                8 Claims

ABSTRACT OF THE DISCLOSURE

A process is described for the preparation of a permanently magnetizable iron-containing particulate metal material wherein from a ferrous ion containing solution, wherein other metals are present in an atomic quantity not larger than half that of the ferrous ion, the metals are co-precipitated by gradual and homogeneous conversion of at least ⅔ part of the bivalent iron to trivalent iron to a pH between 2 and 6.5 and under controlled temperature conditions, and said conversion is controlled to proceed at a rate no greater than at most 0.3 gram atoms per liter of solution per hour. The precipitate is subsequently separated from the solution and washed and dried.

BACKGROUND OF THE INVENTION

The invention relates to a process for the preparation of a permanently magnetizable material containing iron, in which process mixed iron oxides are precipitated from a solution.

U.S. patent application Ser. No. 811,623, filed Mar. 28, 1969, now abandoned describes a process for the precipitation of mixtures or compounds of hydrated oxides of iron and other elements such as nickel and cobalt. As stated in said patent application, it is desirable to start from a solution containing the iron in bivalent form. At a pH of 2, trivalent iron has already completely precipitated, while the oxides of nickel and cobalt start precipitating at pH 6. Bivalent iron, on the other hand, does not precipitate until the pH has gone up to a value between 6 and 7. Thus, it is only by deposition of iron as the ferrous hydroxide that the required conditions of coprecipitation with the other metal ions depositing in the said pH range are satisfied.

The above-mentioned process, although yielding excellent results, still has several drawbacks. In the first place, the coprecipitated compounds are strongly hydrated; and removal of the water of hydration is essential for obtaining a material with a sufficiently high degree of permanent magnetizability.

This removal of water hydration calls for a calcination temperature of at least about 300° C. The resulting material usually has a high porosity and, in consequence, cannot readily be processed to powders or bodies with the required or desired high concentration of magnetizable material.

Secondly, the oxidation of bivalent iron to trivalent iron, which is also required for the use of the magnetizable oxides, may give rise to difficulties. Normally, this oxidation will take place at room temperature during filtration of the precipitated material; however, in certain mixed oxides the iron appears to be present in a stabilized form, on account of which the requisite ferrous to ferric oxidation is difficult to realize.

The present state of the art may also be considered to embrace the precipitation of iron hydroxide particles with NaOH from a solution containing ferrous and ferric ions. However, the particles thus coprecipitated are too small for usual magnetic applications, so that they must be enlarged by a hydrothermal process, see e.g. Elmore, W. C. Phys. Rev. 54, 309 (1938).

Further, Swiss patent specification 311,280 discloses a procedure by which hydroxides or carbonates are precipitated in an alkaline medium from a solution containing ferrous and other ions, including ferric ions if so desired, following which the said hydroxides and carbonates are oxidized to the trivalent form. This procedure has similar drawbacks, as that described in the above-mentioned U.S. patent application Ser. No. 811,623, which makes it necessary to apply calcination at temperatures of up to 900° C.

DESCRIPTION OF THE INVENTION

According to the process of the present invention, the iron and, if so desired, one, or several, other metals also present in the solution in bivalent form and in an atomic quantity not larger than half that of the iron, are co-precipitated, with simultaneous agitation, by gradual and homogeneous conversion of part (e.g. at least about ⅔) of the bivalent iron ions to the trivalent form, at a pH adjusted at a value between 2 and 6.5, and under controlled temperature conditions, said conversion proceeding at an average rate of at most 0.3 g. atoms per liter of solution per hour. The precipitate is subsequently separated from the solution, washed and dried, whereupon the resulting material is subjected to a further thermal treatment, should this be necesary.

Said further thermal treatment may consist of calcination, with or without complete or partial reduction of the precipitated material.

By "controlled temperature conditions" is meant here that a set temperature value, or the variation in temperature with time, is adjusted to the desired precipitation conditions. By "homogeneous" is further meant that the concentration of bivalent and trivalent ions is not a function of the place in the solution, not even if arbitrarily small unit volumes are considered; by "gradual" is understood that the increase in concentration from bivalent to trivalent ions per unit time is such that the precipitate is formed on the surface of precipitation nuclei that have already formed and not in the body of the solution.

If air was used as the oxidation agent, during the passage of the air, a high concentration of ferric ions would be built up at the gas-liquid interphase. These ions would precipitate as extremely small, non-magnetic, hydrated ferric oxide particles.

According to the process of the present invention the iron can be converted from the bivalent to the trivalent form by having nitrate ions present in the solution—preferably nitrate ions of ammonium nitrate—with use of a temperature higher than room temperature (e.g. above about 18-20° C.). It should be explicitly stated, however, that the invention also covers the use of oxidation agents other than nitrates, such as ions of halogen oxy-acids or peroxides. In general, oxidation agents may be employed in this process provided (1) they have the oxidation potential necessary to correct the ferrous ions to the ferric ions and (2) they do not themselves form a precipitatory salt with the metal in the solution being treated.

When nitrate ions are used as the oxidant, the following reaction may be initiated above room temperature:

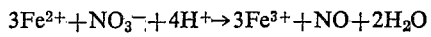

$$3Fe^{2+} + NO_3^- + 4H^+ \rightarrow 3Fe^{3+} + NO + 2H_2O$$

The ferric ions thereby homogeneously and gradually formed in the solution now react with bivalent metal ions ($M^{2+}$) according to the reaction

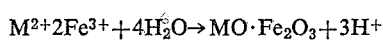

$$M^{2+} + 2Fe^{3+} + 4H_2O \rightarrow MO \cdot Fe_2O_3 + 3H^+$$

A suitable bivalent metal for use in such process can be the ferrous ion itself; when this is used $$FeO \cdot Fe_2O_3 = Fe_3O_4$$

(magnetite) precipitates. This action is also covered by the term coprecipitation as used in this application.

In view of the resulting desired magnetic properties, it is preferred to coprecipitate other non-ferrous bivalent ions together with the iron, such as nickel, cobalt, zinc, manganese, copper, magnesium and barium. The precipitation is then continued under controlled temperature conditions until the required quantity of the metal ions present has been precipitated. The chemical composition of the coprecipitate to be prepared depends on the metals present besides iron, in the initial solution, and on their molecular ratios, which, in turn, may be selected according to the ultimate magnetic properties desired.

An important condition is that during the precipitation the pH must be kept at a value between 2 and 6.5, for which purpose the hydrogen ions released in the reaction may have to be neutralized. This may be accomplished by injecting an alkaline solution of soda, sodium bicarbonate, ammonia or similar inorganic bases into the solution. If so desired, the pH value can be kept accurately constant by controlling the same by means of a pH meter. By the term "injecting" there is meant herein contacting the alkaline solution with the reacting solution with no other phase being in the immediate vicinity.

Another possibility is to add urea to the solution, either before or during the precipitation. Due to the gradual hydrolysis of the urea to ammonium carbonate, carbonate ions are thus introduced into the solution and these are effective to bind the hydrogen ions according to the following equation:

$$(NH_2)_2CO + 2H_2O \longrightarrow (NH_4)_2CO_3 \xrightarrow{+ H^+} H_2O + CO_2 + NH_4^+$$

If at the start of the precipitation the pH must be exactly set at the desired value, this is preferably done by means of nitric acid. Said acid does not introduce any "foreign" elements into the permanently magnetizable material, i.e. no more than do the ammonium nitrate, urea or ammonia solution otherwise used in the process.

It is pointed out that in U.S. patent application Ser. No. 811,623, filed Mar. 28, 1969, a process is described which also starts from an aqueous solution containing ferrous ions and at least one type of other bivalent metal ions in the atomic ratio of more than two ferrous ions to one ion of another bivalent metal. To the metal salt solution, with a pH preferably below 3, an alkaline substance is added to bring the pH at a value not lower than 6.5. The ferrous compound thus precipitated is oxidized with a gaseous oxidant, to which end air is bubbled through the liquid. Owing to the heterogeneous distribution of the air in the liquid, during practice of such a process on an industrial scale it cannot be avoided that the ferrous compound formed earlier will be converted to some small or large extent to an hydrated ferric oxide, even if an elevated temperature is employed.

In the process according to the present invention, however, where both the precipitation, in an adjusted acid medium, and the oxidation are effected in the homogeneous liquid phase, this disadvantage is completely obviated. The permanently magnetizable material prepared according to the process of the present invention can be used on tapes, sheets or wires for the magnetic recording or reproduction of information or (whether or not in combination with a plastic binder) be made into objects possessing permanent magnetic properties.

The invention will be further elucidated with reference to the following example.

EXAMPLE

Preparation of permanently magnetizable cobalt oxide/iron oxide powder

Urea (130 g.) and $NH_4NO_3$ (20 g.) were dissolved in water (3 liters). The solution was boiled to expell dissolved oxygen and cooled under nitrogen. By means of nitric acid the pH of the solution was then adjusted to about 2. Subsequently, 24.3 g. of $Co(NO_3)_2 \cdot 6H_2O$ (5 g. of cobalt) and 575 ml. of a ferrous chloride solution containing 42.5 g. of iron were added, whereupon the solution was heated to 100° C. with thorough stirring. After 70 hours at this temperature, a black precipitate had formed and the pH now equaled 5.8. The average rate at which the ferrous iron was oxidized, equalled to $3 \times 10^{-3}$ g. atom per liter per hour. The precipitate could be readily filtered off and washed; the filtrate contained very little iron.

After drying at 120° C., the powder showed an X-ray diffraction diagram analogous to that of magnetite ($Fe_3O_4$). The particle size derived from the line broadening is approximately 1000 A. units.

The powder was then dried at 120° C., mixed with a solution of 20% by weight of polyurethane in dimethylformamide and spread on a polyester film. The powder content of the coating was 80% by weight. The hysteresis loop, measured on a stack of 32 tapes cut from this film, is shown in the figure. M and H in the figure represent magnetization and applied field strength respectively. The maximum field strength is 1500 oe.; the coercive force equals approximately 350 oe.

It will thus be seen that practice of the process according to the present invention may be carried out by various specific procedures. In general, the non-ferrous bivalent ions present may comprise an atomic ratio non-ferrous bivalent ion to ferrous ions of zero to 1/3, whereas other metals (e.g. non-precipitating alkali metals) may be present in any desired ratio amounts.

The total heavy metal content of the solution should be of the order of 1 to about 25 grams per liter.

The temperatures employed during the precipitation reaction are, as stated, "controlled," and will generally lie within the range of about 50° C. to about 95° C., depending upon the specific conditions and results desired, which are easily ascertainable by single experiment according to the teachings herein.

It will also be understood that the particulate metal oxide material produced according to the process of this invention will have substantially each precipitated particle composed of each of the combination of metals employed—that is, this material is substantially free from particles composed solely of only one of such metals. In general, the particulate size of the precipitate obtained by the practice of this invention will be in the range of about $0.1\mu$ to about $0.5\mu$.

Accordingly, the scope of this invention is in accord with the spirit of the disclosure hereinabove, and as defined by the following claims.

What is claimed is:

1. A process for the preparation of a permanently magnetizable iron-containing particulate metal oxide material in the form of $MO \cdot Fe_2O_3$, where M is at least one metal in bivalent form selected from the class consisting of elements from Group I–B, II–B, VII–B and VIII, having an atomic number of at most 30, and from Group II–A of the Periodic Table, comprising forming an aqueous solution of ferrous ions and ions of said at least one metal in bivalent form in an atomic quantity not larger than one-half that of the iron present, gradually and homogeneously converting in the absence of a gaseous oxidizing agent at least a portion of said ferrous ions to ferric ions with an oxidizing agent present in said solution, said oxidizing agent being selected so as to not itself form a precipitating salt with the ions present in said aqueous solution, with simultaneous agitation and maintaining the solution homogeneously at a pH between about 2 and 6.5 and at a temperature such that said conversion of ferrous ions into ferric ions by said oxidizing agent proceeds at a rate of at most 0.3 gram atoms per liter of solution per hour whereby particles of said particulate metal oxide material are caused to precipitate, said particles having a size within the range from 0.1μ to about 0.5μ, and separating said particulate metal oxide material from said solution.

2. The process of claim 1 wherein said gradual and homogeneous conversion is effected by an oxidizing agent selected from the group consisting of nitrate ions, ions of halogen oxy-acids or peroxides at a temperature in the range of from about 50 to 95° C.

3. The process of claim 2 wherein said oxidizing agent is nitrate ions furnished by ammonium nitrate.

4. The process of claim 1 wherein the said pH of said solution is maintained at a value between about 2 and 6.5 by injection of an inorganic alkaline solution therein.

5. The process of claim 4 wherein said alkaline solution is selected from the group consisting of solutions of sodium carbonate, sodium bicarbonate and ammonia.

6. The process of claim 1 wherein urea is introduced into said solution to maintain the pH within said range.

7. The process of claim 1 wherein the non-ferrous bivalent ions present comprise an atomic ratio of non-ferrous bivalent ion to ferrous ions of zero to ⅓.

8. The process of claim 1 wherein the total metal content of the solution is of the order of about 1 to about 25 grams per liter.

References Cited

UNITED STATES PATENTS

| | | | |
|---|---|---|---|
| 3,141,738 | 7/1964 | Kagitani | 23—200 |
| 2,939,767 | 6/1960 | Martin | 23—200 |

FOREIGN PATENTS

| | | | |
|---|---|---|---|
| 719,283 | 12/1954 | Great Britain | 23—200 |
| 888,688 | 1/1962 | Great Britain | 252—62.63 |

OTHER REFERENCES

Vogel: "Quantitative Inorganic Analysis," 3rd edition, John Wiley & Sons (1961), p. 113.

JAMES E. POER, Primary Examiner

J. COOPER, Assistant Examiner

U.S. Cl. X.R.

252—62.56; 23—200